US011333267B2

(12) United States Patent
Vignerol et al.

(10) Patent No.: US 11,333,267 B2
(45) Date of Patent: *May 17, 2022

(54) VALVE AND DEVICE FOR STORING AND DISPENSING PRESSURIZED FLUID

(71) Applicant: L'Air Liquide, Société Anonyme pour l'Etude et l'Exploitation des Procédés Georges Claude, Paris (FR)

(72) Inventors: Samuel Vignerol, Fontenay le Fleury (FR); Antoine Frenal, Ezanville (FR); Denis Muller, Rueil Malmaison (FR); Hervé Paoli, Rueil Malmaison (FR); Olivier Ondo, Palaiseau (FR); Morgan Lamiable, Metzer Visse (FR); Johan Broechler, Villerupt (FR); Claudio Di Filippo, Noisseville (FR)

(73) Assignee: L'Air Liquide, Société Anonyme pour l'Etude et l'Exploitation des Proceédés Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/753,080

(22) PCT Filed: Aug. 2, 2018

(86) PCT No.: PCT/FR2018/051995
§ 371 (c)(1),
(2) Date: Apr. 2, 2020

(87) PCT Pub. No.: WO2019/068971
PCT Pub. Date: Apr. 11, 2019

(65) Prior Publication Data
US 2020/0292134 A1 Sep. 17, 2020

(30) Foreign Application Priority Data

Oct. 5, 2017 (FR) .................................... 1701024
Oct. 5, 2017 (FR) .................................... 1701025

(51) Int. Cl.
*F17C 13/04* (2006.01)
*F16K 35/02* (2006.01)
(Continued)

(52) U.S. Cl.
CPC ........ *F16K 31/52408* (2013.01); *F15B 20/00* (2013.01); *F16K 1/302* (2013.01);
(Continued)

(58) Field of Classification Search
CPC ........ F17C 2205/0326; F17C 2250/043; F17C 2223/0123; F17C 2201/0109;
(Continued)

(56) References Cited

U.S. PATENT DOCUMENTS 1,944,456 A * 1/1934 Pearson .................. F16K 35/14
137/271
3,737,140 A 6/1973 Toth
(Continued)

FOREIGN PATENT DOCUMENTS

EP 3 062 005 8/2016
EP 3062005 A1 * 8/2016 ............. F16K 1/303
(Continued)

OTHER PUBLICATIONS

FR-2790299-A3 English Translation of Specification (Year: 2021).*
(Continued)

*Primary Examiner* — Timothy P. Kelly
*Assistant Examiner* — Stephanie A Shrieves
(74) *Attorney, Agent, or Firm* — Elwood L. Haynes

(57) ABSTRACT

A valve for pressurized fluid including a body having a front face and a rear face and housing an internal fluid circuit having an upstream end configured to be placed in communication with a reserve of pressurized fluid and a downstream end configured to be placed in communication with a user of fluid, the circuit including a collection of valve (Continued)

shutter(s) including at least one shutoff valve shutter allowing the circuit to be closed or opened, the valve including a control lever controlling the collection of valve shutter(s), an end for grasping, the control lever being mounted with the ability to rotate on the valve between a rest position and an active position in which the control lever is away from the body of the valve and actuates the collection of valve shutter(s) into a position in which the circuit is open with a first bore section.

1 Claim, 4 Drawing Sheets

(51) Int. Cl.
| | | |
|---|---|---|
| *F16K 31/524* | (2006.01) | |
| *F15B 20/00* | (2006.01) | |
| *F16K 31/60* | (2006.01) | |
| *F16K 1/44* | (2006.01) | |
| *F16K 35/14* | (2006.01) | |
| *F16K 1/30* | (2006.01) | |
| *F17C 1/00* | (2006.01) | |
| *F15B 15/26* | (2006.01) | |

(52) U.S. Cl.
CPC ............ *F16K 1/303* (2013.01); *F16K 1/304* (2013.01); *F16K 1/443* (2013.01); *F16K 31/602* (2013.01); *F16K 35/025* (2013.01); *F16K 35/14* (2013.01); *F17C 1/00* (2013.01); *F17C 13/04* (2013.01); *F15B 2015/267* (2013.01); *F17C 2201/0109* (2013.01); *F17C 2201/032* (2013.01); *F17C 2201/058* (2013.01); *F17C 2203/0617* (2013.01); *F17C 2205/035* (2013.01); *F17C 2205/0326* (2013.01); *F17C 2205/0329* (2013.01); *F17C 2205/0385* (2013.01); *F17C 2205/0394* (2013.01); *F17C 2221/011* (2013.01); *F17C 2223/0123* (2013.01); *F17C 2223/036* (2013.01); *F17C 2223/043* (2013.01); *F17C 2227/044* (2013.01); *F17C 2250/043* (2013.01); *F17C 2260/021* (2013.01); *F17C 2260/044* (2013.01); *F17C 2260/056* (2013.01)

(58) Field of Classification Search
CPC ...... F17C 2203/0617; F17C 2205/0329; F17C 2205/035; F17C 2205/0385; F17C 2205/0394; F17C 2221/011; F17C 2223/036; F17C 2227/044; F17C 13/04; F17C 2201/032; F17C 2223/043; F17C 2260/021; F17C 2260/044; F17C 2260/056; F17C 2201/058; F15B 2015/267; F15B 20/00; F16K 31/52408; F16K 1/303; F16K 1/302; F16K 1/304; F16K 31/602; F16K 1/443; F16K 35/025; F16K 35/14
USPC ........................ 137/613, 637.1, 384.2–384.8
See application file for complete search history.

(56) References Cited

U.S. PATENT DOCUMENTS

| | | | | |
|---|---|---|---|---|
| 5,421,380 | A | * | 6/1995 | Campbell ................. B08B 9/08 |
| | | | | 137/327 |
| 5,738,145 | A | * | 4/1998 | Daicho ................... F16K 1/305 |
| | | | | 137/878 |
| 6,035,463 | A | | 3/2000 | Pawelzik et al. |
| 8,056,580 | B2 | * | 11/2011 | Lang ....................... F16K 35/04 |
| | | | | 137/557 |
| 9,097,622 | B2 | * | 8/2015 | Gotch ................... F16K 27/065 |
| 2004/0231729 | A1 | | 11/2004 | Lang et al. |
| 2005/0173007 | A1 | | 8/2005 | Cannet et al. |
| 2006/0175569 | A1 | * | 8/2006 | Henson ................. F16K 35/022 |
| | | | | 251/287 |
| 2014/0048169 | A1 | * | 2/2014 | Pisot ........................ F17C 5/06 |
| | | | | 141/4 |
| 2016/0153617 | A1 | | 6/2016 | Mellors | |

FOREIGN PATENT DOCUMENTS

| | | | | |
|---|---|---|---|---|
| FR | | 2 790 299 | 9/2000 | |
| FR | | 2790299 | A3 * 9/2000 | .......... F16K 11/0873 |
| FR | | 2 793 297 | 11/2000 | |
| GB | | 441 279 | 7/1924 | |
| GB | | 834 759 | 8/1958 | |
| WO | WO 2016 146743 | | 3/2016 | |

OTHER PUBLICATIONS

International Search Report and Written Opinion for corresponding PCT/FR2018/051995, dated Dec. 19, 2018.
International Search Report and Written Opinion for related PCT/FR2018/052001, dated Nov. 20, 2018.
International Search Report and Written Opinion for related PCT/FR2018/052005, dated Nov. 20, 2018.
International Search Report and Written Opinion for related PCT/FR2018/052002, dated Nov. 23, 2018.
International Search Report and Written Opinion for related PCT/FR2018/052003, dated Nov. 23, 2018.
International Search Report and Written Opinion for related PCT/FR2018/051994, dated Dec. 19, 2018.
International Search Report and Written Opinion for related PCT/FR2018/052000, dated Dec. 19, 2018.

* cited by examiner

VALVE AND DEVICE FOR STORING AND DISPENSING PRESSURIZED FLUID

CROSS REFERENCE TO RELATED APPLICATIONS

This application is a 371 of International Application PCT/FR2018/051995, filed Aug. 2, 2018, which claims priority to French Patent Application Nos. 1701024 and 1701025, both filed Oct. 5, 2017, the entire contents of which are incorporated herein by reference.

BACKGROUND

The invention relates to a valve and to a device for storing and dispensing pressurized fluid.

The invention relates more particularly to a valve for pressurized fluid comprising a body having a front face and a rear face and housing an internal fluid circuit having an upstream end intended to be placed in communication with a reserve of pressurized fluid and a downstream end intended to be placed in communication with a user of fluid, the circuit comprising a collection of valve shutter(s) comprising at least one shutoff valve shutter allowing the circuit to be closed or opened, the valve comprising a control lever controlling the collection of valve shutter(s), comprising an end, notably a terminal end, for grasping, the control lever being mounted with the ability to rotate on the valve between a rest position in which the control lever is positioned along or facing the front face of the body of the valve and in which the collection of valve shutter(s) is placed in a position in which the circuit is closed, and an active position in which the control lever is away from the body of the valve and actuates the collection of valve shutter(s) into a position in which the circuit is open with a first bore section, the valve comprising a locking mechanism locking the control lever in its rest position, the locking mechanism comprising a locking lever equipped with an end (29), notably a terminal end, for grasping, the locking lever being able to move in rotation on the valve between a locked first position and an unlocked second position.

For safety reasons, it is known practice to provide a mechanism for locking the member for manually controlling the opening of an isolation valve shutter of a valve for (a) pressurized gas cylinder(s) (see for example FR2793297A1).

When the cylinder equipped with such a valve is being transported, dropped or handled, a projecting object (straight rod or the like) is able to actuate this mechanism and unlock the control member. This inadvertent movement of the locking/unlocking member is all the more dangerous when actuation thereof allows the valve to be pre-opened to release gas even before the control member has been moved.

In order to avoid inadvertent actuation, the manipulation of the locking member may be made more complicated. However, that may detract from the ergonomics of use of the valve.

SUMMARY

It is an object of the present invention to alleviate all or some of the above-mentioned disadvantages of the prior art.

To this end, the valve according to the invention, in other respects in accordance with the generic definition thereof given in the above preamble, is essentially characterized in that, in its first position, the locking lever is positioned along or facing the front face of the body of the valve and ensuring locking of the control lever, preventing it from being moved from its rest position to its active position, in its second position the locking lever being further away from the body of the valve and allowing the control lever to be moved from its rest position to its active position, when the locking lever is in its first position and at the same time the control lever is in its rest position, the ends for grasping of the control lever and of the actuating lever being positioned adjacently along or facing the front face of the body of the valve.

Furthermore, embodiments of the invention may comprise one or more of the following features:
- when the locking lever is in its first position and at the same time the control lever is in its rest position, the ends for grasping of the control lever and of the actuating lever are offset laterally and/or vertically with respect to one another on the front face of the body of the valve,
- when the locking lever is in its first position and at the same time the control lever is in its rest position, the ends for grasping of the control lever and of the actuating lever are offset in the front/rear direction of the valve, the end for grasping being set back in the rearward direction by a determined separation with respect to the end for grasping of the control lever,
- the separation is comprised between a few millimeters to a few centimeters, notably comprised between 0.5 and 4 cm,
- when the locking lever is moved into its second position, its end for grasping comes to the same level as the end for grasping of the control lever in the front/rear direction,
- when the locking lever is in its second position and at the same time the control lever is moved toward its active position, a mechanism of the valve allows or causes the same movement of the locking lever,
- the valve comprises a coupling mechanism that couples the movement of the control lever and of the actuator when the control lever is moved from its active position toward its rest position and/or from its rest position toward its active position, the coupling mechanism automatically moving the actuator when the control lever is moved,
- when the locking lever is in the first position, the end for grasping of this locking lever is situated a first distance away from the front face of the body of the valve which distance is comprised between zero and 4 cm, notably between 1 and 3 cm,
- the control lever and the locking lever articulated about respective, distinct or coincident rotation axles,
- the control lever and the locking lever are able to move in rotation in the one same plane or in parallel adjacent planes,
- when the control lever is in its rest position and at the same time the locking lever is in the first position, a portion of the locking lever is situated between the front face of the body of the valve and a portion of the control lever, which is to say that, in the front/rear direction of the valve, the locking lever is partially concealed by the control lever except for its portion for grasping,
- in its unlocked second position, the locking lever actuates the collection of valve shutter(s) into a position in which the circuit is open with a second bore section, the bore section being different from and notably smaller than the first bore section,
- the collection of valve shutter(s) comprises two distinct shut-off valve shutters able to move with respect to respective seats and in the open position respectively defining the two distinct bore sections, the two valve shutters being controlled by the control lever and by the actuator, respectively, the valve comprises a return member returning the actuator toward its locked first position, the valve comprises a retaining mechanism providing stable retention of the control lever at least in its active position, the two distinct shut-off valve shutters are arranged in series in the one same line of the circuit, the two shutoff valve shutters are controlled by at least one mobile pushrod controlled by the control lever and by the actuator, movement of the actuator from its locked first position toward its unlocked a second position moves the pushrod over a first travel that actuates the opening of a first valve shutter(s) into an open position with the second bore section for the circuit; the subsequent movement of the control lever from its rest position toward its active position moves the pushrod over a second travel actuating the opening of the second valve shutter into a position in which the circuit is open with the first bore section, the mechanism for locking the control lever in its rest position comprises a mobile mechanical stop, the locking mechanism that locks the control lever in its rest position acts on a cam attached to the control lever, the locking mechanism that locks the control lever in its rest position comprises a mechanical end stop between a profile of the cam of the control lever and a mobile member of a mechanism transmitting movement between the cam and the collection of valve shutter(s), the two levers are articulated to the body and each comprise a respective cam having a respective cam profile and collaborating with at least one mobile pushrod for control of the collection of shutoff valve shutter(s).

The invention also relates to a reservoir or collection of reservoirs for pressurized fluid, notably pressurized gas, comprising a valve according to any one of the features above or below.

The invention may also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
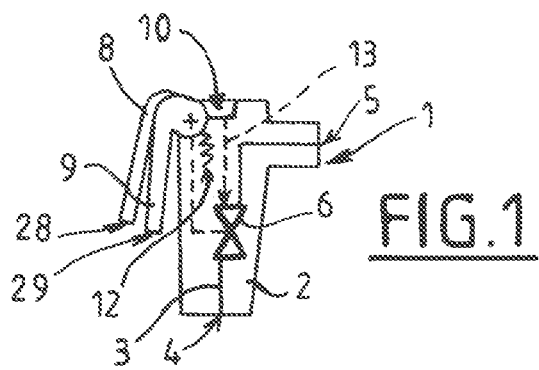
FIG. 1 is a schematic and partially sectioned view illustrating the structure and operation of a first possible embodiment of the invention.

The valve 1 illustrated in the figures comprises in the conventional way a body 2 housing a fluid circuit 3 having an upstream end 4 intended to be placed in communication with a reserve of pressurized fluid and a downstream end 5 intended to be placed in communication with a user of fluid.

The upstream end 4 may be connected to a pressurized gas cylinder 11 (see FIGS. 8 to 10) or to circuitry connected to a pressurized-gas cylinder or several cylinders (rack of cylinders for example). For this purpose, the corresponding end of the body 2 of the valve 1 may be threaded at its lower end.

The downstream end 5 opens for example onto an outlet connector.

The circuit 3 comprises a collection of valve shutter(s) comprising at least one shutoff valve shutter 6 allowing the circuit 3 to be closed or opened (isolation valve for example).

Figure 5:
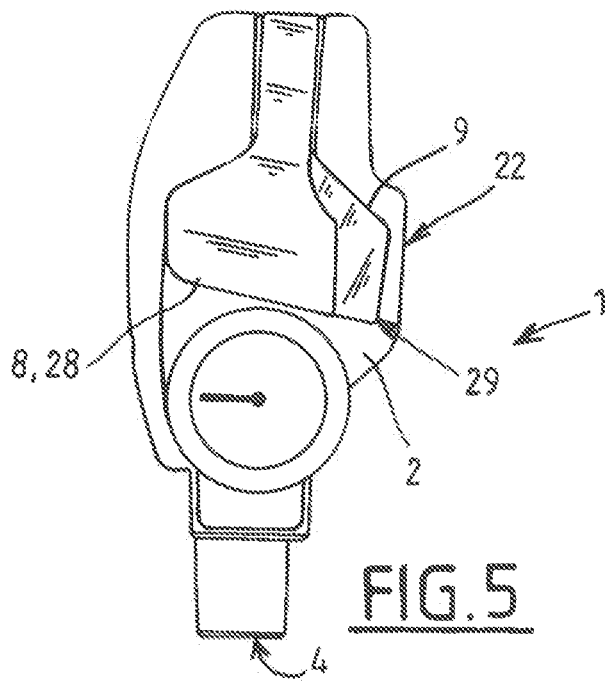
FIG. 5 depicts a schematic and partial face-on view illustrating another embodiment of a valve according to the invention.

The body 2 of the valve comprises a front face (see FIG. 5) and a rear face (see FIG. 6) and lateral edges or ends (see the lateral ends of the valve in FIG. 5).

The valve 1 comprises a control member 8 for manual control of the collection of valve shutter(s) 6.

The control lever 8 is preferably a lever mounted with the ability to rotate on the valve 1 between a rest position (FIGS. 1, 2, 3, 5, 6, 7 and 9) in which the collection of valve shutter(s) 6 remains closed (for example via a return member such as a spring) which corresponds to the circuit 3 being closed, and an active position (see FIGS. 3 and 10) in which the control member 8 actuates the collection of valve shutter(s) 6 into a position in which the circuit 3 is open with a first bore section S1 (notably fully open).

The control lever 8 comprises an end 28 for grasping.

In the rest position, the control lever 8 is positioned along or facing the front face of the body 2 of the valve 1 and the collection of valve shutter(s) 6, 7 is arranged in a position in which the circuit is closed. For example, the control lever 8 has a substantially rectilinear portion which is in a substantially vertical position in the rest position.

In its active position, the control lever 8 is distanced from the body 2 of the valve and actuates the collection of valve shutter(s) 6, 7 into a position in which the circuit 3 is open with a first bore section S1. For example, in the active position, the substantially rectilinear portion of the lever 8 is substantially horizontal and/or situated in an upper part of or above the body 2 of the valve 1.

As visible notably in FIGS. 6, 7, 9 and 11, the outlet connector 5 may be situated on the rear face of the body 2 of the valve 1.

The valve 1 comprises a locking mechanism 9, 10 locking the control member 8 in its rest position.

The locking mechanism 9, 10 for locking the control lever 8 in its rest position comprises locking lever 9 equipped with an end 29 for grasping, notably a terminal end. The locking lever 9 is able to rotate on the valve between a locked first position (FIG. 2) and an unlocked second position (FIG. 3).

In its first position, the locking lever 9 is preferably positioned along or facing the front face of the body 2 of the valve 1 and locks the control lever 8 preventing it from being removed from its rest position toward its active position (for example via an end stop 10).

In its second position, the locking lever 9 is further away from the body 2 of the valve and allows the control lever 8 to move from its rest position toward its active position (the end stop 10 is retracted for example).

Figure 6:
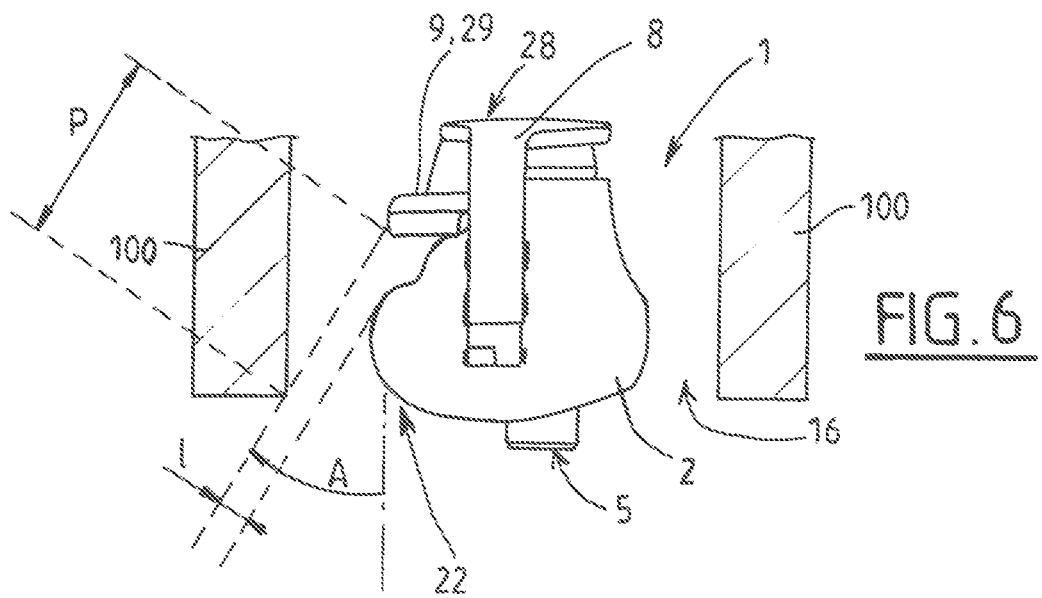
FIG. 6 is a schematic and partially sectioned view from above of the valve of FIG. 5 associated with a protective bonnet.
Figure 7:
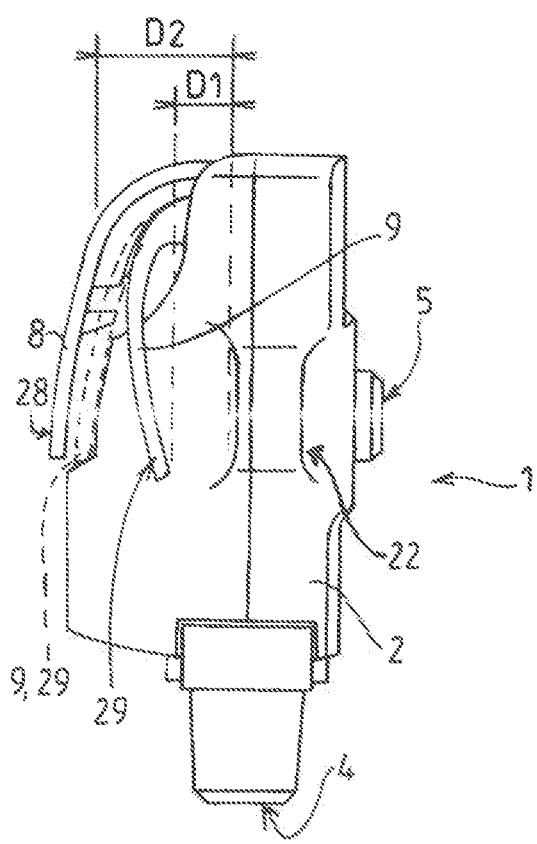
FIG. 7 is a schematic and partial side (lateral) view of the valve of FIG. 5.

As illustrated notably in FIGS. 5, 6 and 7, when the locking lever 9 is in its first position and at the same time the control lever 8 is in its rest position, the terminal ends for grasping 28, 29 of the control lever 8 and of the actuating lever 9 are positioned adjacently along or facing the front face of the body 2 of the valve.

The terminal ends for grasping 28, 29 of the control lever 8 and of the actuating lever 9 can also be positioned above a display (pressure gauge for example) see FIG. 5. In such a way that the two terminal ends 28, 29 of the levers in the rest/locked position form a protective "roof" or rim over the display of the valve or other functional member.

As may be seen notably in FIGS. 5 to 7, when the locking lever 9 is in its first position and at the same time the control lever 8 is in its rest position, the terminal ends for grasping 28, 29 of the control lever 8 and of the actuating lever 9 are preferably situated at the same level in the vertical direction of the valve but are offset laterally from one another on the front face of the body 2 of the valve. In a variant, the ends for grasping 28, 29 of the control lever 8 and of the actuating lever 9 may be offset vertically (for example, the end 29 for grasping of the locking lever could be situated below the end 28 for grasping of the control lever 8 in the vertical direction).

Likewise, when the locking lever 9 is in its first position and at the same time the control lever 8 is in its rest position, the terminal ends for grasping 28, 29 of the control lever 8 and of the locking lever 9 may be offset in the front/rear direction of the valve. What that means is, for example, that the end 29 for grasping of the locking lever 9 is preferably set back by a determined distance toward the rear with respect to the terminal end 28 for grasping of the control lever 8 (see FIG. 7).

This separation may be comprised between a few millimeters to a few centimeters, notably comprised between 0.5 and 4 cm.

As a preference, when the locking lever 9 is moved into its second position, its end 29 for grasping comes to the same level or a level very close to the terminal end 28 for grasping of the control lever 8 in the front/rear direction.

This allows the user easily to pull/lift the locking lever 9 toward himself in order to release the control lever 8. The unlocked control lever 8 may in turn be pulled/lifted easily with the same hand (see FIG. 10).

In the locked first position of the locking lever 9 (see FIGS. 1, 2, 5, 6, 7 and 9), the end 29 for grasping of the locking lever 9 is for example positioned along or facing the front face of the body of the valve 1 at a first distance D1 from the front face of the body of the valve (see FIG. 7). This first distance D1 may be comprised between zero and 4 cm for example (notably between 0.5 and 3 cm or between 1 and 2 cm).

In its unlocked second position of the locking lever 9, the terminal end 29 for grasping may be separated from the front face of the body of the valve 1 by a second distance D2 which is greater than the first distance (see FIG. 7 position in a dotted line), for example greater by 1 to 5 cm. This second distance D2 may be comprised between 1 and 6 cm for example, notably between 3 and 5 cm.

Thus, in order to actuate the control lever 8 the operator needs beforehand (or simultaneously) to move the locking lever 9. In order to do that, the user may use a finger to pull the terminal end 29 for grasping forward so as to move the locking lever 9 away from the body 2 of the valve.

The control lever 8 and the locking lever 9 may be articulated about distinct or coincident respective rotation axles 21, 19. Likewise, the control lever 8 and the locking lever 9 may be articulated about parallel rotation axles 21, 29 and the two levers 8, 9 may rotate in the same plane or in parallel adjacent planes (see FIGS. 7 and 10).

As illustrated in FIGS. 5 to 7 in particular, when the control lever 8 is in its rest position and at the same time the locking lever 9 is in the first position, a portion of the locking lever 9 is preferably situated between the front face of the body of the valve and a portion of the control lever 8. What that means to say is that, in the front/rear direction of the valve, the locking lever 9 may be partially concealed on the front face by the control lever 8 except for its terminal portion 29 for grasping which projects laterally with respect to the control lever 8.

In its unlocked second position, the end 29 for grasping of the locking lever 9 may be separated from the front face of the body of the valve 1 by a second distance D2 which is greater than the first distance (see FIG. 7, position in dotted line). This second distance D2 may be comprised between 0.5 and 6 cm for example, notably between 3 and 5 cm.

Figure 10:
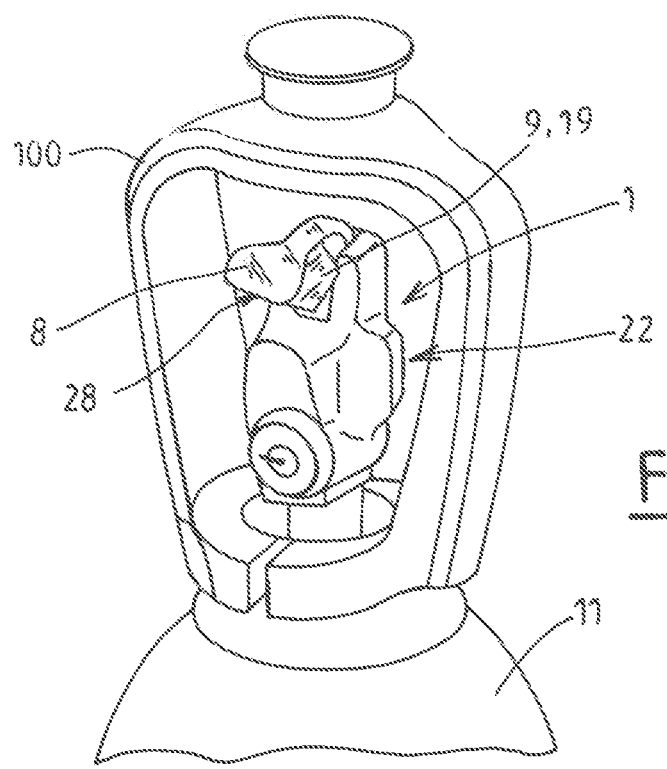
FIG. 10 is a view from the front at a slight angle of the valve of FIG. 5, mounted on its gas reservoir and protected by its bonnet, in an open configuration.

In its active position, the terminal end for grasping of the control lever 8 is separated from the body of the valve (see FIG. 10). In its active position, the control lever 8 may be substantially horizontal, namely substantially perpendicular to the front face of the body 2 of the valve.

According to one possible advantageous particular feature, in its unlocked second position (see FIG. 7 in dotted line), the locking lever 9 actuates the collection of valve shutter(s) 6, 7 into a position in which the circuit 3 is open with a second bore section S2 (partially open) that is preferably smaller than the first bore section S1.

As a preference, the second bore section S2 is smaller than the first bore section S1 (the corresponding withdrawal flow rates are thus distinct). For example, the ratio S2/S1 between the second bore section S2 and the first bore section S1 is comprised between 1/100 and 1/20, notably between 1/50 and 1/2, and preferably between 1/80 and 1/30 or between 1/10 and 1/5. Thus, in order to be able to fully open the circuit 3 of the valve 1 using the lever 8, the user needs beforehand to actuate the distinct locking lever 9 which unlocks the control lever 8 and partially opens the circuit.

The two degrees of opening S1, S2 of the circuit 3 may be achieved by a single valve shutter 6 having two respective open positions (see FIG. 1). However, as a preference, the two degrees of opening (S1, S2) are achieved via two distinct valve shutters 6, 7 (see FIGS. 2 and 3).

Figure 2:
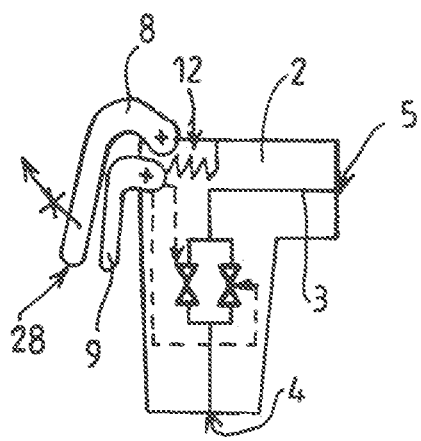
FIG. 2 is a schematic and partial view in cross section illustrating the structure and operation of a second possible embodiment of the invention in a configuration of use.
Figure 3:
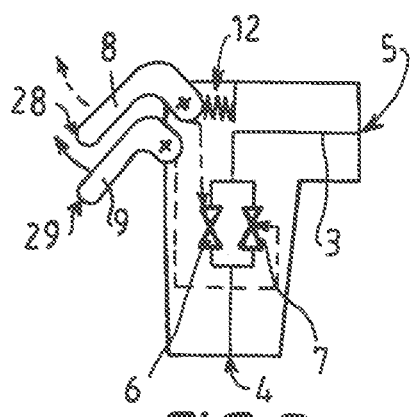
FIG. 3 is a schematic and partial view in cross section illustrating the structure and operation of a second possible embodiment of the invention in a configuration of use.

For example, as illustrated in FIGS. 2 and 3, the valve 1 may comprise two distinct shutoff valve shutters 6, 7 able to move with respect to respective seats and respectively defining, according to their sequence of opening (one, 6, of them open and then both, 6, 7 open), the two distinct bore sections S2, S1).

Figure 11:
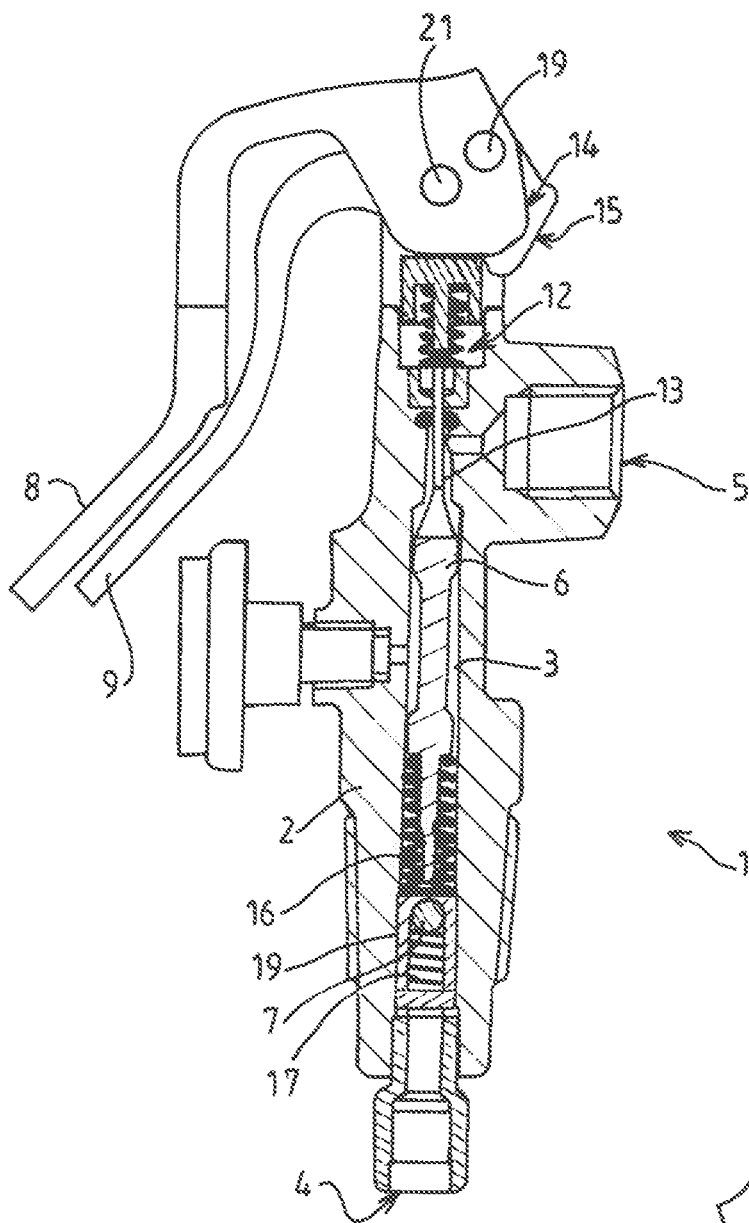
FIG. 11 is a schematic and partially sectioned view illustrating the structure and operation of another possible embodiment of the invention.

The two distinct shutoff valve shutters 6, 7 could be arranged in series in the circuit 3 (see FIG. 11). This first valve shutter 6 is for example able to move in translation with respect to a seat and forced toward the seat. In the closed position, the first valve shutter 6 may sealingly close the circuit. In the closed position, the second valve shutter 7 non-sealingly closes the circuit 3. What that means to say is that the second valve shutter 7 has a calibrated orifice defining the second bore section S2 of the circuit 3.

The second valve shutter 7 comprises for example a ball 7 pushed toward a seat by a spring 17. For example, the ball 7 bears non-sealingly against a seat (for example a bushing) with a predetermined spacing (bore section S2).

The passage (second bore section S2) between the ball 7 and the seat (bushing) can be obtained by impairing the line of sealing between the ball and its seat by broaching, or by a stroke with a saw or another tool on the ball or on its seat. The ball 7 can be not perfectly cylindrical (faceted ball, porous ball, or ball of any other shape that allows the gas to pass at a limited flow rate).

Another alternative solution may be to place a calibrated orifice in parallel with this second valve shutter 7 in order to provide the limited passage of gas. Alternatively, this calibrated orifice may pass through the body of the valve shutter 7.

Actuation of the locking lever 9 may move a movement transmission mechanism 13 by a first travel which in its turn moves the first valve shutter 6 which opens the circuit 3 at the first valve shutter 6 (see FIG. 1). The gas which is permitted to pass through the calibrated orifice of the second valve shutter 7 can thus escape toward the second end 5 of the circuit 3. The gas coming from the first end 4 of the circuit 3 effectively passes between the ball 7 and the bushing 19 and then between the body 2 and the valve shutter 6 and can leave the valve 1.

The system of locking of the control lever 8 can be located at a cam 14 attached to this lever.

Figure 12:
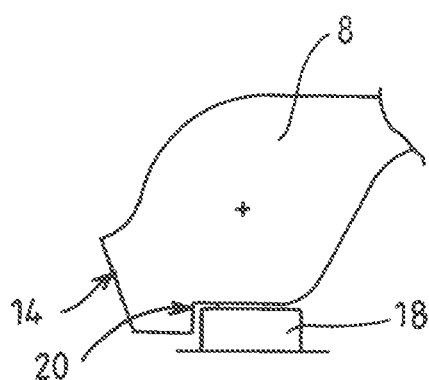
FIG. 12 depicts an enlarged view in cross section of a detail of FIG. 11.

For example, the profile of the cam 14 of the control lever 8 may comprise a shape 20 which comes into abutment with a complementary shape belonging to the movement transmission mechanism (and notably the end of a pushrod 18, see FIG. 12). In the raised position (locking lever 9 in the locked position, see FIG. 6 or 2), the movement transmission mechanism (and notably the end of a pushrod 18) forms a mechanical end stop preventing the control lever 8 from rotating.

In the lowered position (locking lever 9 in the unlocked position, see dotted line in FIG. 7 or 3), the movement transmission mechanism (and notably the end of a pushrod 18) is retracted and no longer forms a mechanical end stop preventing the control lever 8 from rotating.

At the end of this first travel, the control lever 8 is thus unlocked and a reduced flow rate of gas is released.

This first travel thus allows the pushrod 18 to be positioned beyond an angle of abutment at the profile 20 of the cam 14.

The control lever 8 can then be pivoted in its turn in order to move the mechanism 18, 13 a little further (second travel). This second travel allows the second valve shutter 7 (ball) to be moved off its seat (via the end of the first valve shutter 6). In this configuration, the circuit 3 is open more extensively (fully, first bore section S1). This allows the gas a higher flow rate and a more rapid rise in pressure downstream of the valve shutters.

When the control lever 8 is lifted up (active position) the actuating lever 9 may (or possibly must) be likewise lifted up (see FIG. 10). Of course, as an alternative, the actuating lever 9 could remain in the lowered position (closer to the body than the control lever 8 which is lifted up into the active position).

In this way, the two valve shutters 6, 7 can be controlled by the one same movement transmission mechanism and notably at least one same mobile pushrod 18, 13.

This movement transmission mechanism may effect a translational movement by two different travels, the one a short travel allowing a limited flow rate (second bore section S2), and the other a long travel allowing the full flow rate (first bore section S1).

Of course, the invention is not restricted to the example of the figures described hereinabove. The two travels of the movement transmission mechanism may be controlled by cams having axles of rotation 21, 19 and attached to the levers 8, 9 that are identical. The rotation axles may be coincident or distinct.

As a preference, the full (re-)closure of the two valve shutters 6, 7 may be brought about in a single gesture which allows the two valve shutters 6, 7 to be neutralized in the one same manual action.

For example, a mechanism for coupling the movement of the control lever 8 and of the actuator 9 can be incorporated into the cams 14, 15 of the levers.

For example, a rod 21 attached to at least one cam 8 may be housed in at least one groove 10 formed in the other cam 15 and accommodating and guiding the rod 21.

Thus, the movement of the control lever 8 toward its rest position also causes the return of the actuating lever 9 toward its locked position.

Conversely, when the actuating lever 9 has been lifted up into its unlocked second position, the movement of the control lever 8 toward its active (for example lifted-up) position may also cause the locking lever 9 to move (to be lifted up for example into the position of FIG. 10).

Of course, the invention is not restricted to the examples hereinabove. For example, the locking mechanism could be incorporated into the cams 14, 15 via a system of rods 21 and grooves of the same type as that of the coupling mechanism. Likewise, this locking mechanism for the control member 8 could be located elsewhere on the valve. In addition, this locking mechanism could be of the magnetic and/or pneumatic and/or electromechanical and/or hydraulic type.

According to one possible embodiment, a lifting-up of the locking lever 9 therefore allows the unlocking of the lever 8, possibly associated with a partial opening of the circuit.

This configuration affords a dual safety feature: 1) the need for unlocking, limiting unwanted openings, 2) the unlocking partially opens the circuit 3 thereby starting the process of progressive opening and alerting the user to the presence of gas at the outlet.

This makes it possible to reduce the pressure spike downstream by slowing the rate of pressurization of the downstream chamber of the gas circuit connected to the outlet 5 of the valve 1.

Figure 4:
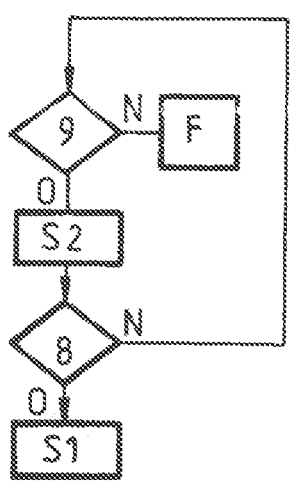
FIG. 4 is a schematic and partial view illustrating one possible and optional example of the principle of operation of the valve.

FIG. 4 schematically illustrates the operation of this advantageous but optional possible feature. If the locking lever 9 is not activated (N) (namely if it is in its locked first position), the circuit 3 is closed (F). If the locking lever 9 is activated toward its unlocked second position (O), the circuit 3 is open to a degree of opening S2, which then allows the lever 8 to be actuated. Actuation of the control lever 8 (O) then allows the circuit to be fully opened (S1). Otherwise (N) the valve 1 returns to its closed or open position depending on the position of the locking lever 9.

As a preference, the direction of actuation of the locking lever 9 is identical (for example translation/rotation away from the body 2) to the direction of actuation of the control lever 8 (control lever 8 pulled up away from the body). The same is true of the return to the rest and locked positions (toward the body 2).

As a preference also, the locking lever 9 is monostable, which means to say that the user has to maintain the force thereon (keep it lifted up) in order to keep the travel active, otherwise it returns automatically to its locked first position (circuit 3 closed).

In order to do that, the valve 1 may comprise a return member 12 returning the actuator 9 toward its locked first position (notably a spring) see FIGS. 2 and 3. Alternatively or cumulatively, the return member returning the locking lever 9 toward its locked first position may comprise or consist of the pressure of the fluid in the circuit. What that means to say is that the service pressure of the gas in the circuit may apply to the locking lever 9 a force which tends to return it to its first position.

However, it is possible to provide a third stable position. For example, if the locking lever 9 accompanies the control lever 8 into its active position (see for example FIG. 10), the lever 9 could also have a stable position in this third position.

The control lever 8 may for its part have a bi-stable travel. What that means is that, at least the rest (FIG. 5) and active (FIG. 10) positions may be stable. Of course it is possible to provide one or more stable positions, notably an intermediate stable position between the two, rest and active, positions and in which the degree of opening of the collection of valve shutters 6, 7 is identical to that of the rest position or to that of the active position.

For example, a hard-point end-stop mechanism (cam profile of the lever 8) provides these stable positions. The user may release the control lever 8 in the active position without this release causing the circuit 3 to close.

As a preference, the closing of the circuit 3 (from a wide-open position S1) is achieved in a single gesture. As a preference, the control lever 8 and the locking 9 lever 9 are moved together into the initial (circuit closed) position via a coupling mechanism that couples the movement of the control member 8 and of the locking lever 9. For example, this coupling mechanism automatically urges the actuator 9 toward its first position when the control lever 8 is moved from its active position toward its rest position (from the position of FIG. 10 toward the position of FIG. 5).

As a preference, the two levers 8, 9 can be manipulated with a single hand (in the direction of opening and/or in the direction of closing of the circuit).

Thus, when the locking lever 9 is actuated (pulled toward the front), a cam 15 of this lever 9 may move the first valve shutter 6 via a movement transmission mechanism. The movement transmission mechanism may notably comprise one or more pushrods 13, 18 in series (and/or in parallel), an elastic member 12 (notably a spring to compensate for lash and/or to maintain contact in the drivetrain transmitting movement between the cam 15 and the valve shutter 6). Any other movement transmission mechanism may be envisioned. Reference may be made for example to document FR2828922A1.

It will therefore be appreciated that, while being simple and inexpensive in structure, the invention offers numerous advantages.

In instances in which the actuation of the locking lever 9 brings about partial opening of the circuit, this valve structure also allows the user other functionalities. Thus, brief actuation of the locking lever 9 alone allows the user to generate a jet of gas that is sufficient and controlled for purging/cleaning the downstream part of the circuit 3 and notably the outlet connector. This is notably a measure recommended by valve manufacturers.

As may be seen in the figures, the body 2 of the valve may comprise a portion 22 that conceals at least the terminal end 29 for grasping of the locking lever 9. This concealing portion 22 forms a barrier between the rear face of the body of the valve and the terminal end 29 for grasping of the lever 9 so as to prevent or limit the possibility of a rectilinear object being able to push on the locking lever 9 from the rear of the valve at the terminal end 29 for grasping (in order to move it from its locked position into its unlocked position).

Figure 8:
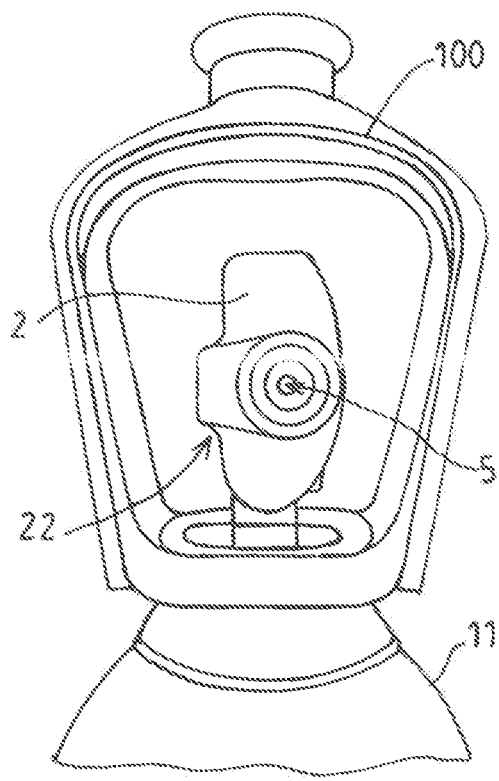
FIG. 8 is a schematic and partial view from the rear of the valve of FIG. 5, mounted on a gas reservoir and protected by a bonnet.
Figure 9:
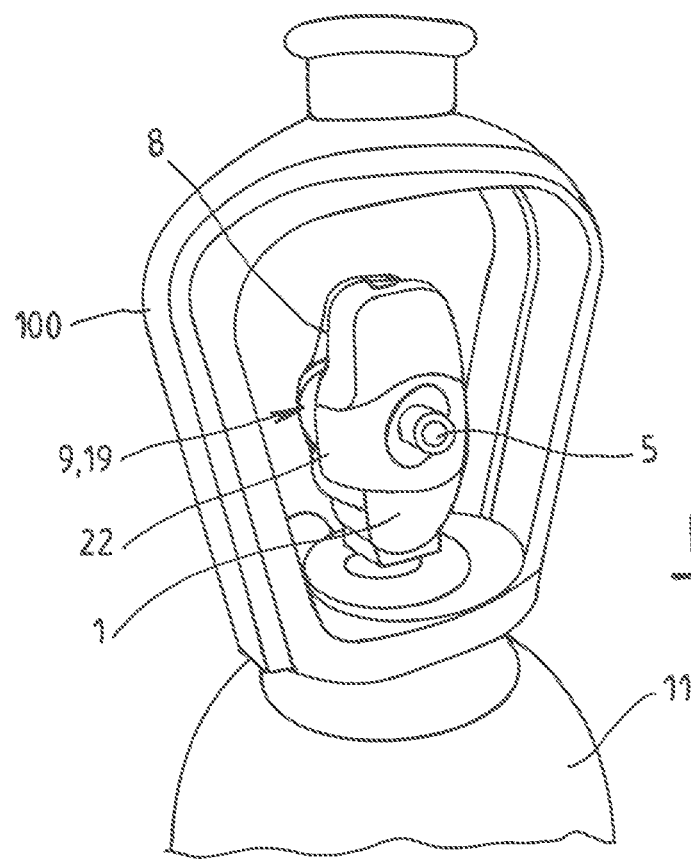
FIG. 9 is a view from the rear at a slight angle of the valve of FIG. 5, mounted on its gas reservoir and protected by its bonnet.

Thus, as is visible in FIG. 8 in particular, in a view from the rear, the locking lever 9 is hidden by the body 2 of the valve 1 and more particularly by the concealing portion 22 which may form a lateral boss on the body 2 of the valve (see FIG. 5 also).

The concealing portion 22 maybe of one piece with the material of the body of the valve delimiting the internal circuit 3. What that means is that the concealing portion 22 may be of one piece with the metal (for example brass) which structurally forms the valve and houses its internal components. Of course, as a variant, and as depicted in FIGS. 5 to 10, this concealing portion 22 may be formed as a shell or a covering or a member attached to the (metallic) body of the valve delimiting the internal circuit (3) permanently or removably. What that means to say is that this concealing portion 22 could be removed if this outer shell were removed. Thus, when it comes to defining the concealing portion 22, the term "body" of the valve here refers to the envelope of the valve defining the exterior contours of the valve.

The concealing portion 22 prevents or limits the risk of inadvertent opening from the rear (the terms front/rear and the front/rear direction or the lateral directions refer to the front and rear faces of the valve).

As visible in FIG. 6, the rear face of the concealing portion 22 may be curved or inclined in the direction of the front face of the valve as it extends gradually toward one lateral end of the body of the valve. That allows an object that might impinge on the rear face of the body 2 of the valve to be deflected laterally.

Likewise, the rear face of the terminal end 29 for grasping of the locking lever 9, namely the face that is situated facing the front face of the body 2 of the valve 1, may be curved or inclined in the direction of the front of the valve as it extends gradually toward the lateral end of the valve. This may also play a part in laterally deflecting the end of an object that might impinge on the locking lever 9 from the rear at the level of the terminal end 29 for grasping of the locking lever 9. That limits the possibility of an object applying sustained pressure to this surface.

For preference, at least the locking lever 9 may become positioned in a depression in the body 2, making it even less accessible from the rear face.

Of course as a variant the lever or levers 9, 8 could be housed in one or more hollow depressions in the front face of the body 2 of the valve preventing any access from the rear (whatever the angle of incidence).

FIGS. 6 and 8 to 10 illustrate the instance in which the valve is mounted on a reservoir 11 and protected by a protective bonnet 100. The bonnet 100 (for example in the form of a bow) has at least one rear opening 16 for accessing the valve via its rear face. As a preference, when the locking lever 9 is in the first position, direct access to the terminal end 29 for grasping of the lever 9 via the rear opening 16 with a rectilinear object (a rod or a pin for example) is not possible or is possible only through a narrow window defined by a direction offset by an angle (A) with respect to the front/rear direction of the valve. This angle A may be comprised between 20 and 60°, notably between 20 and 40° or 50° depending on the angular orientation of the bonnet with respect to the front/rear direction. In addition, said window preferably has a width I less than or equal to 3 cm (see FIG. 6 where two lateral uprights of the bonnet 100 are depicted schematically and in horizontal section).

In addition, as a preference, when the locking lever 9 is in the first position, the distance P of direct access to the terminal end 29 for grasping of the lever 9 through the rear opening 16 is comprised between 5 cm or 6 cm and 20 cm, and preferably comprised between 8 and 15 cm at least.

What that means to say is that the relative geometries of the concealing portion 22 and of the bonnet 100 make it impossible or near-impossible to activate the locking lever 9 accidentally from the rear. The accessible zone is effectively extremely small or nil. A very precise angle defined hereinabove combined with a very precise shape (width and length) of object would be needed for example in order to be able to actuate from the rear.

The possible shapes will necessarily need to be slender, and if the object is too short (for example less than 6 to 8 cm) it will not reach the lever 9. In addition, if the object is too long, it becomes very difficult or impossible to maintain stable pressure on the locking lever 9.

The cross section of the object needs in particular to be small, because otherwise it will not fit through the gap (I) between the bonnet 100 and the concealing portion 22 of the body 2 (gap for example equal to 2 cm in width).

If the control lever 8 is also a lever, for example adjacent to the locking lever 9, the concealing portion 22 also must conceal the control lever 8.

The invention applies for example to lever-operated valves or taps that can be opened by lifting (or pushing) the main isolating lever for cylinder(s) of pressurized fluid (gas or gas mixtures in particular), having for example an equivalent water volume of between 5 and 50 liters.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A valve for pressurized fluid comprising a body having a front face and a rear face and housing an internal fluid circuit having an upstream end configured to be placed in communication with a reserve of pressurized fluid and a downstream end configured to be placed in communication with a user of fluid, the circuit comprising one or more valve shutter(s) comprising at least one shutoff valve shutter allowing the circuit to be closed or opened, the valve comprising a control lever controlling the one or more valve shutter(s), comprising an end for grasping, the control lever being mounted with the ability to rotate on the valve between a rest position in which the control lever is positioned along or facing the front face of the body of the valve and in which the one or more valve shutter(s) is placed in a position in which the circuit is closed, and an active position in which the control lever is away from the body of the valve and actuates the one or more valve shutter(s) into a position in which the circuit is open with a first bore section, the valve comprising a locking mechanism locking the control lever in the rest position, the locking mechanism comprising a locking lever equipped with an end for grasping, the locking lever being able to move in rotation on the valve between a locked first position and an unlocked second position, in the first position, the locking lever being positioned along or facing the front face of the body of the valve and locking the control lever thereby preventing movement from the rest position toward the active position, in the second position, the locking lever being further away from the body of the valve and allowing the control lever to move from the rest position toward the active position, when the locking lever is in the first position and at the same time the control lever is in the rest position, the terminal ends for grasping of the control lever and of the locking lever being positioned adjacently along or facing the front face of the body of the valve, when the locking lever is it is in the first position and at the same time the control lever is in the rest position, the ends for grasping of the control lever and of the locking lever being offset in the front/rear direction of the valve, the end for grasping of the locking lever being set back in the rearward direction by a determined separation with respect to the end for grasping of the control lever, and when the locking lever is moved into the second position, the end for grasping comes to the same level as the end for grasping of the control lever in the front/rear direction, wherein, in the unlocked second position, the locking lever actuates the one or more valve shutter(s) into a position in which the circuit is open with a second bore section, the second bore section being different from the first bore section, wherein the two shutoff valve shutters are controlled by at least one same mobile pushrod controlled by the control lever and by the locking lever, wherein movement of the locking lever from the locked first position toward the unlocked second position moves the pushrod over a first travel that actuates the opening of a first valve shutter into an open position with the second bore section for the circuit; the subsequent movement of the control lever from the rest position toward the active position moves the pushrod over a second travel actuating the opening of the second valve shutter into a position in which the circuit is open with the first bore section.

* * * * *